(12) United States Patent
Arase

(10) Patent No.: US 12,473,105 B2
(45) Date of Patent: Nov. 18, 2025

(54) TRANSMISSION DEVICE FOR UNMANNED AERIAL VEHICLE

(71) Applicant: ARASE AIZAWA AEROSPATIALE LLC, Hamamatsu (JP)

(72) Inventor: Kunio Arase, Hamamatsu (JP)

(73) Assignee: ARASE AIZAWA AEROSPATIALE LLC, Hamamatsu (JP)

( * ) Notice: Subject to any disclaimer, the term of this patent is extended or adjusted under 35 U.S.C. 154(b) by 0 days.

(21) Appl. No.: 18/861,775

(22) PCT Filed: Oct. 2, 2023

(86) PCT No.: PCT/JP2023/035886
§ 371 (c)(1),
(2) Date: Oct. 30, 2024

(87) PCT Pub. No.: WO2024/080181
PCT Pub. Date: Apr. 18, 2024

(65) Prior Publication Data
US 2025/0282502 A1    Sep. 11, 2025

(30) Foreign Application Priority Data

Oct. 11, 2022 (JP) ................. 2022-163594

(51) Int. Cl.
*B64U 50/27* (2023.01)
*B64U 10/14* (2023.01)
*B64U 50/11* (2023.01)
(52) U.S. Cl.
CPC ............ *B64U 50/27* (2023.01); *B64U 10/14* (2023.01); *B64U 50/11* (2023.01)
(58) Field of Classification Search
CPC ........ B64D 27/04; B64U 50/20; B64U 50/27; B64U 10/14; B64U 50/11; F01L 1/047;
(Continued)

(56) References Cited

U.S. PATENT DOCUMENTS

| 4,331,111 | A | * | 5/1982 | Bennett | F02B 63/04 |
| | | | | | 123/197.1 |
| 2020/0263602 | A1 | * | 8/2020 | Knob | F16F 15/24 |

FOREIGN PATENT DOCUMENTS

| CN | 109823537 A | 5/2019 |
| JP | 2017-193321 A | 10/2017 |

(Continued)

OTHER PUBLICATIONS

International Search Report and Written Opinion received for PCT/JP2023/035886, mailed Dec. 19, 2023.

*Primary Examiner* — Victor L Macarthur
(74) *Attorney, Agent, or Firm* — Greer, Burns & Crain, Ltd

(57) ABSTRACT

A transmission device for an unmanned aerial vehicle (UAV), wherein arms driving propellers are positionable to not interfere with an air cleaner and a radiator. A transmission device for a UAV in which arms are positioned on a machine body upper section and propellers are driven using a straight-four engine, the transmission device including a drive gear that is attached to a crankshaft; a clutch shaft drive gear that meshes with the drive gear; a bevel gear that drives a drive shaft; a drive shaft base gear that is driven by the bevel gear; a top section gear train that includes a drive shaft main gear, a left sub-gear meshing with the main gear, a reverse gear meshing with the main gear, and a right sub-gear meshing with the reverse gear; first and second bevel gears that mesh with the left sub-gear and drive the first and second arms.

4 Claims, 5 Drawing Sheets

(58) Field of Classification Search
CPC .. F01N 13/10; F01N 2340/04; F01N 2590/00; F02B 75/24
See application file for complete search history.

(56) References Cited

FOREIGN PATENT DOCUMENTS

| | | |
|---|---|---|
| JP | 2020-100387 A | 7/2020 |
| JP | 6932411 B1 | 9/2021 |

* cited by examiner

TRANSMISSION DEVICE FOR UNMANNED AERIAL VEHICLE

BACKGROUND

The present invention relates to a transmission system for an unmanned aerial vehicle, and more specifically, to a transmission system for an unmanned aerial vehicle that allows propeller-driving arms extending from the airframe to be arranged in a way that prevents interference with radiators or air cleaners installed on the upper part of the unmanned aerial vehicle, without raising the positions of the arms.

As an example, Patent Document 1 (Japanese Patent No. 6932411) discusses an unmanned aerial vehicle with a two-cylinder engine. When constructing a new unmanned aerial vehicle (quadcopter) with a four-cylinder engine, replacing the two-cylinder engine of the aircraft, the increased sizes of the air cleaner and radiator would cause interference with the four arms that drive the propellers. If the height of the drive shaft is increased to raise the mounting positions of the arms, interference between the arms and the air cleaner or radiator can be avoided, but the overall height of the airframe will increase. If the height of the airframe is increased, both the transportability of the airframe to the airfield and the ability to load cargo and equipment onto the lower part of the airframe would be compromised.

PRIOR-ART DOCUMENT

Patent Document

Patent document 1: Japanese Patent No. 6932411

SUMMARY

To overcome the issues of the prior art, the present invention aims to provide a transmission system for an unmanned aerial vehicle that allows the propeller-driving arms to be arranged in a way that prevents them from interfering with the air cleaner or radiator.

A transmission system for an unmanned aerial vehicle according to the present invention is provided for the unmanned aerial vehicle, which includes an airframe, four arms, namely a first arm, a second arm, a third arm, and a fourth arm, arranged on the airframe in a clockwise direction, propellers provided on each end of the respective arms, and an inline four-cylinder engine that drives the propellers. The transmission system includes the following components:
- a drive gear mounted on a crankshaft of the inline four-cylinder engine:
- a driven gear mounted on a clutch shaft, which meshes with the drive gear:
- a bevel gear mounted on the clutch shaft via a centrifugal clutch, which drives a drive shaft perpendicular to the clutch shaft;
- a base gear mounted on the drive shaft, driven by the bevel gear:
- a top gear assembly, which includes:
  - a main gear mounted on the drive shaft:
  - a left sub-gear that meshes with the main gear:
  - a reverse gear that meshes with the main gear:
  - a right sub-gear that meshes with the reverse gear:
- a first bevel gear and a second bevel gear, each meshing with the left sub-gear, wherein the first bevel gear drives the first arm, and the second bevel gear drives the second arm: and
- a third bevel gear and a fourth bevel gear, each meshing with the right sub-gear, wherein the third bevel gear drives the third arm, and the fourth bevel gear drives the fourth arm.

The inline four-cylinder engine is arranged with the crankshaft positioned laterally, oriented right and left relative to the airframe.

The inline four-cylinder engine is arranged with the pistons positioned horizontally.

An air cleaner is positioned on an upper front portion of the airframe, and a radiator is positioned on an upper rear portion of the airframe.

The transmission system of the unmanned aerial vehicle according to the present invention includes a top gear assembly including the main gear mounted on the drive shaft, the left sub-gear meshing with the main gear, the inverting gear meshing with the main gear, and the right sub-gear meshing with the inverting gear. This arrangement of the top gear assembly allows the first arm and the second arm, extending to the left rear and left front of the airframe respectively, and the third arm and the fourth arm, extending to the right front and right rear of the airframe respectively, to be spaced apart in the lateral direction. The spacing between the first arm and the fourth arm, as well as between the second arm and the third arm, can be widened, allowing the air cleaner and the radiator to be placed in these spaces without interfering with the arms.

The inline four-cylinder engine is arranged with the crankshaft positioned laterally, oriented right and left relative to the airframe, making it easier to achieve lateral balance of the airframe compared to an arrangement where the crankshaft is oriented longitudinally.

The inline four-cylinder engine is arranged with the pistons and cylinders positioned horizontally, so that the pistons and cylinders are horizontal, and the crankshaft is positioned laterally. This arrangement reduces the height of the airframe compared to an arrangement where the pistons and cylinders are positioned vertically, and the crankshaft is positioned laterally.

Even when the air cleaner is positioned at the upper front of the airframe and the radiator is positioned at the upper rear of the airframe, the arms can be arranged to avoid interference with the air cleaner and radiator without raising the height of the drive shaft, allowing the height of the airframe to be reduced. The positions of the second arm and the third arm can be set lower than the top of the air cleaner in a side view.

DETAILED DESCRIPTION

Hereinafter, a transmission system 100 of an unmanned aerial vehicle 200 according to the present invention will be described in detail with reference to the accompanying drawings.

Figure 1:
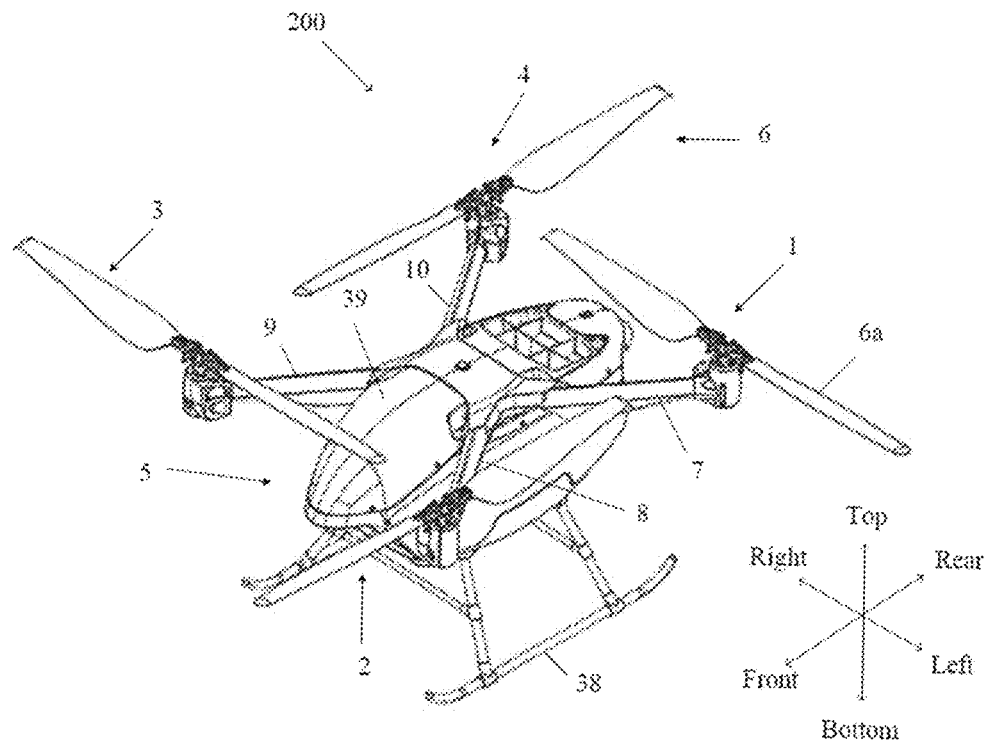
FIG. 1 is an external view of an unmanned aerial vehicle equipped with a transmission system according to the present invention.

FIG. 1 is an external view of an unmanned aerial vehicle 200 equipped with the transmission system 100 according to the present invention. The unmanned aerial vehicle 200 has four propellers 6 on the upper part of the airframe 5. The airframe 5 is equipped with a pair of feet 38 on its lower part and is covered by a cover 39. In a plan view of the airframe 5, the propellers 6 include a first propeller 1, a second propeller 2, a third propeller 3, and a fourth propeller 4 in a clockwise direction. The airframe 5 also features a first arm 7, a second arm 8, a third arm 9, and a fourth arm 10, which are arranged in a roughly diagonal pattern on its upper part, with the propellers 6 mounted at the ends of the respective arms and configured to rotate horizontally. Thus, the unmanned aerial vehicle 200 is also called a quadcopter. Each propeller 6 has two blades 6a and is designed to overlap with the adjacent propellers and to be foldable. All four propellers are positioned at the same height.

Figure 2:
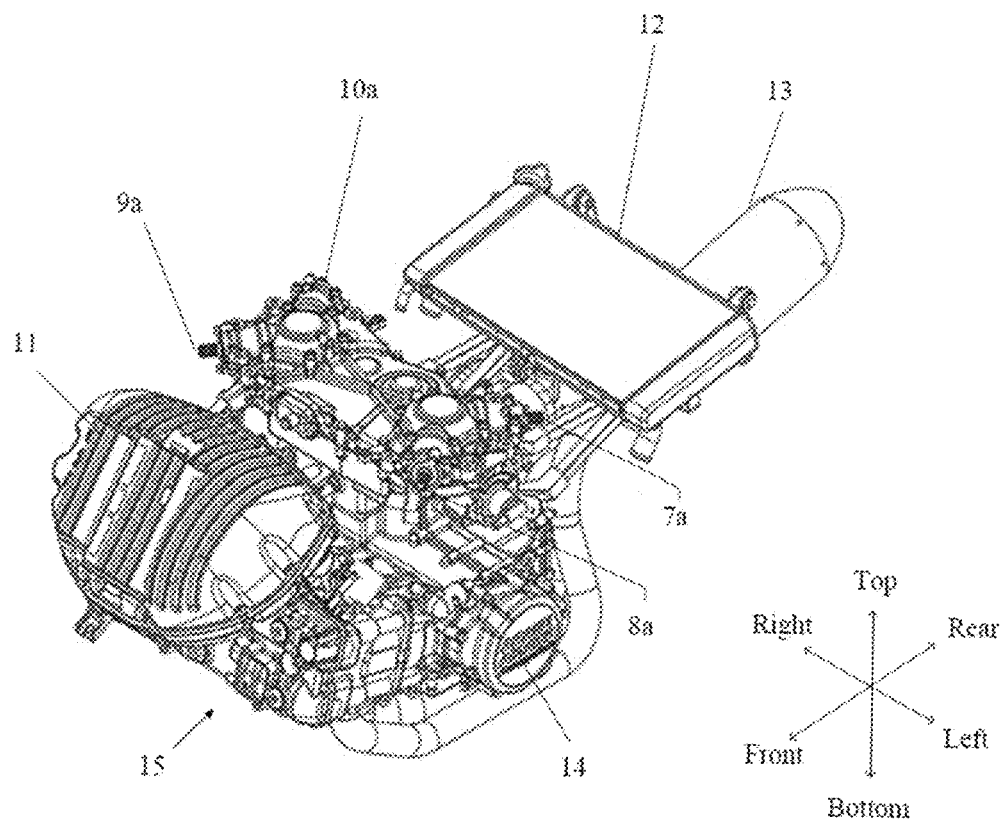
FIG. 2 is a perspective view of an airframe with the propellers, arms, cover, and feet removed.

FIG. 2 is a perspective view of the airframe 5 with the propellers, arms, cover, and feet removed. The airframe 5 includes an air cleaner 11 arranged at the upper front, a radiator 12 positioned at the upper rear, and a muffler 13 extending towards the rear. An inline four-cylinder engine 15 is arranged with a crankshaft 14 positioned laterally, oriented right and left relative to the airframe 5. The first arm 7, second arm 8, third arm 9, and fourth arm 10 are removed in the figure. Therefore, relative to the forward direction of the airframe 5, the connection part 7a of the first arm 7 protrudes to the left rear, the connection part 8a of the second arm 8 protrudes to the left front, the connection part 9a of the third arm 9 protrudes to the right front, and the connection part 10a of the fourth arm 10 protrudes to the right rear.

Figure 3:
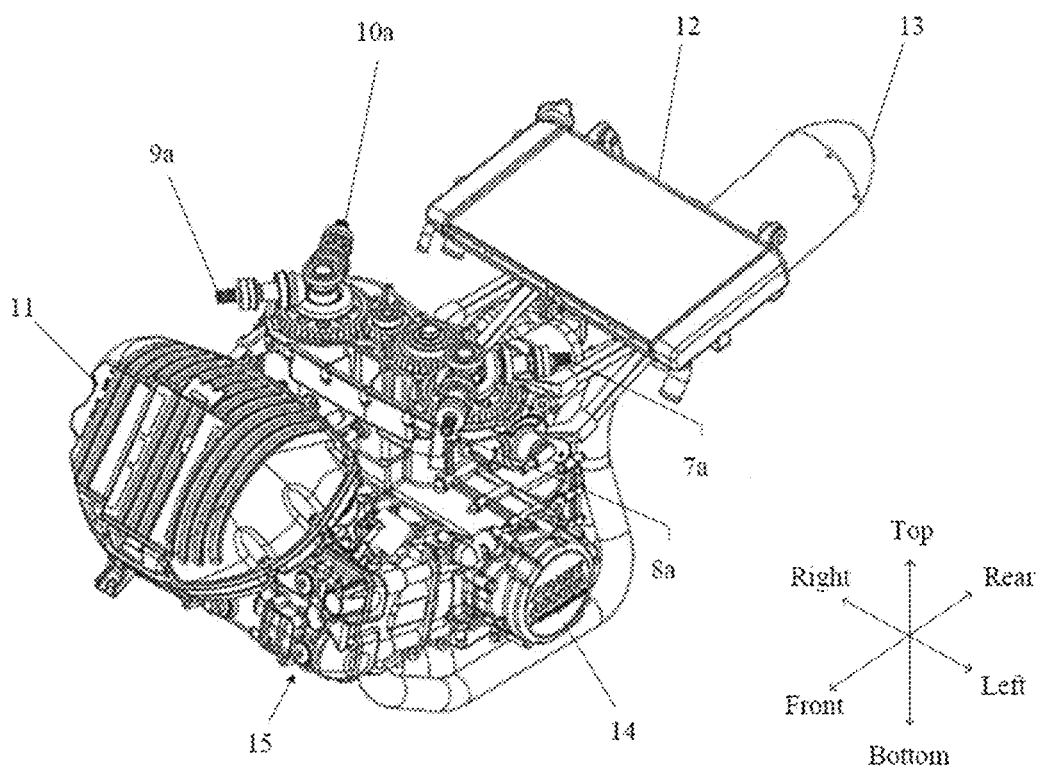
FIG. 3 is a perspective view of the airframe with a gear assembly on the upper part of the airframe in FIG. 2 exposed by removing the covering components.

FIG. 3 is a perspective view of the airframe 5 with the gear assembly on the upper part of the airframe 5 in FIG. 2 exposed by removing the covering components. The base parts of the connection part 7a of the first arm 7, which protrudes to the left rear, and the connection part 8a of the second arm 8, which protrudes to the left front, are arranged to be laterally separated from the base parts of the connection part 9a of the third arm 9, which protrudes to the right front, and the connection part 10a of the fourth arm 10, which protrudes to the right rear, relative to the forward direction of the airframe 5. This arrangement allows the first arm 7, protruding to the left rear, and the fourth arm 10, protruding to the right rear, to be positioned in a way that prevents them from colliding with the radiator 12. Similarly, the second arm 8, protruding to the left front, and the third arm 9, protruding to the right front, can be positioned to prevent them from colliding with the air cleaner 11.

Figure 4:
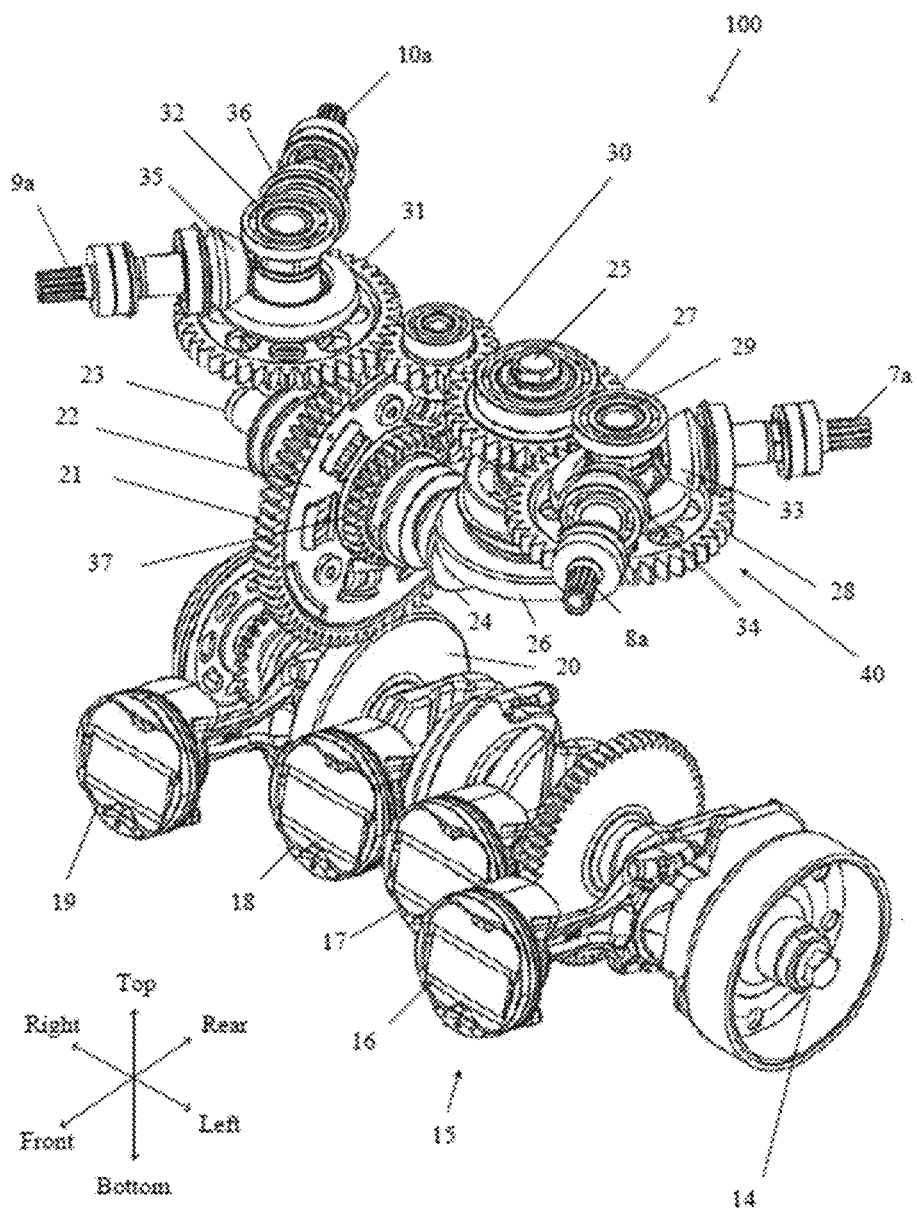
FIG. 4 is an enlarged perspective view of the transmission system according to the present invention.

FIG. 4 is an enlarged perspective view of the transmission system 100 according to the present invention. The first propeller 1, second propeller 2, third propeller 3, and fourth propeller 4 are driven by an inline four-cylinder engine 15. The inline four-cylinder engine 15 includes a first piston 16, second piston 17, third piston 18, and fourth piston 19. Each piston is positioned horizontally, which helps to reduce the height of the airframe 5. The crankshaft 14 is positioned laterally, oriented right and left relative to the airframe 5. The crankshaft 14 rotates due to the intake, compression, combustion, and exhaust motions of each piston. The crankshaft 14 is provided with a drive gear 20, which rotates along with the crankshaft 14.

The crankshaft 14 is accompanied by a horizontally aligned clutch shaft 23 that is equipped with a driven gear 21 that meshes with the drive gear 20. When the rotation of the driven gear 21, which meshes with the drive gear 20, becomes constant, an internal centrifugal clutch 22 within the driven gear 21 is activated, causing a follower gear 37 to rotate, which in turn rotates a bevel gear 24 mounted on the clutch shaft 23. The rotation of the bevel gear 24 rotates causes a base gear 26, mounted on a vertical drive shaft 25 perpendicular to the clutch shaft 23, to rotate. The rotation of the base gear 26 then causes a main gear 27, mounted on the drive shaft 25, to rotate.

The rotation of the main gear 27 causes a left sub-gear 28, which is mounted on the left sub-drive shaft 29 and meshes with the main gear 27, to rotate. Simultaneously, a reverse gear 30, which also meshes with the main gear 27, rotates as well. The rotation of the reverse gear 30 causes a right sub-gear 31, which is mounted on a right sub-drive shaft 32 and meshes with the reverse gear 30, to rotate. The main gear 27, left sub-gear 28, reverse gear 30, and right sub-gear 31 are collectively referred to as a top gear assembly 40. Instead of driving the first to fourth arms directly from the main gear 27, the driving force can be distributed between the left sub-gear 28 and the right sub-gear 31 to drive the arms.

The rotation of the left sub-gear 28 subsequently causes a first bevel gear 33, which meshes with the left sub-gear 28, to rotate, thereby driving a first arm 7. Similarly, the rotation of the left sub-gear 28 causes a second bevel gear 34, which meshes with the left sub-gear 28, to rotate, thereby driving a second arm 8. The rotation of the right sub-gear 31 causes a third bevel gear 35, which meshes with the right sub-gear 31, to rotate, thereby driving a third arm 9. Likewise, the rotation of the right sub-gear 31 causes a fourth bevel gear 36, which meshes with the right sub-gear 31, to rotate, thereby driving a fourth arm 10.

Figure 5:
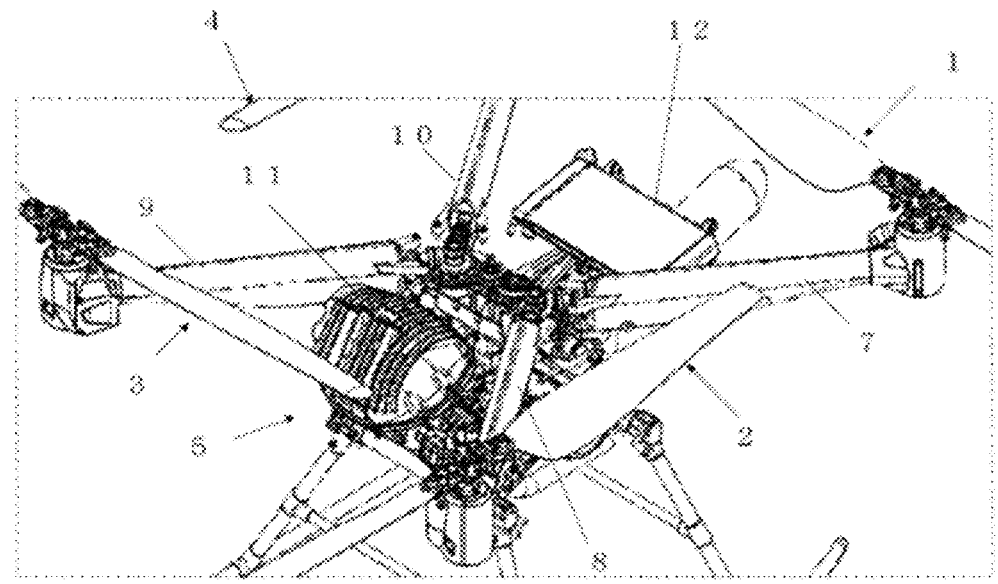
FIG. 5 is a perspective view of the airframe shown in FIG. 3 with the propellers, arms, and feet mounted.

FIG. 5 is a perspective view of the airframe 5 shown in FIG. 3 with the propellers, arms, and feet mounted. As shown in the figure, the first arm 7, which protrudes to the left rear, and the fourth arm 10, which protrudes to the right rear, can be positioned so as not to interfere with the radiator 12. Likewise, the second arm 8, which protrudes to the left front, and the third arm 9, which protrudes to the right front, can be positioned so as not to interfere with the air cleaner 11.

Figure 6:
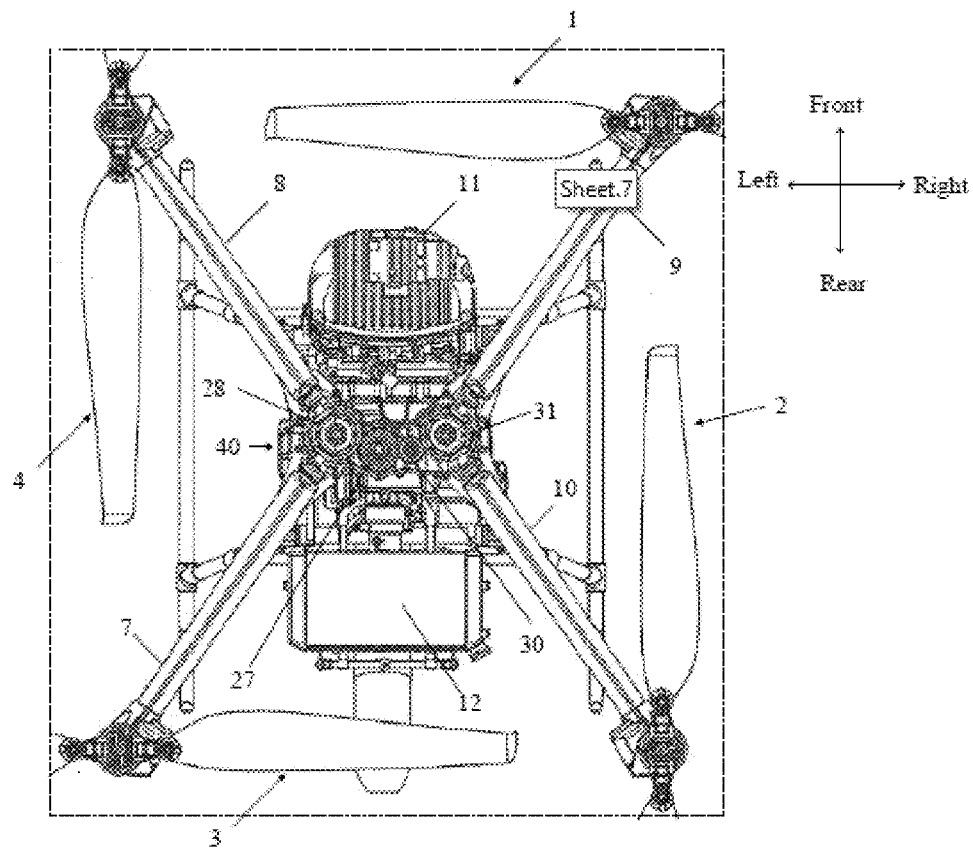
FIG. 6 is a plan view of the airframe shown in FIG. 5.

FIG. 6 is a plan view of the airframe 5 shown in FIG. 5. As shown in the figure, a top gear assembly 40, which includes the main gear 27, the left sub-gear 28 that meshes with the main gear 27, the reverse gear 30 that meshes with the main gear 27, and the right sub-gear 31 that meshes with the reverse gear 30, is provided. This arrangement allows the first arm and second arm, which extend to the left rear and left front respectively, and the third arm and fourth arm, which extend to the right front and right rear respectively, to be positioned apart in the lateral direction. Therefore, the first arm 7, which protrudes to the left rear, and the fourth arm 10, which protrudes to the right rear, can be positioned so as not to interfere with the radiator 12. Likewise, the second arm 8, which protrudes to the left front, and the third arm 9, which protrudes to the right front, can be positioned so as not to interfere with the air cleaner 11.

Figure 7:
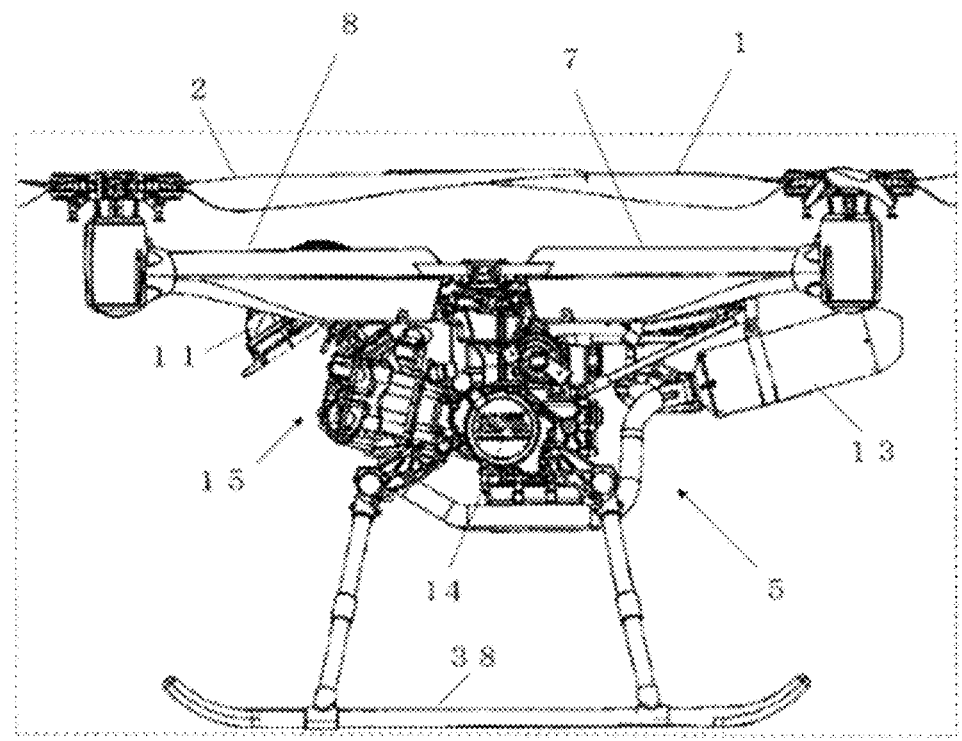
FIG. 7 is a left side view of the airframe shown in FIG. 5.

FIG. 7 is a left side view of the airframe 5 shown in FIG. 5. The inline four-cylinder engine 15 is arranged with the crankshaft 14 oriented laterally relative to the airframe 5, making it easier to achieve left-right balance of the airframe. The inline four-cylinder engine 15 is arranged with the pistons positioned horizontally, which reduces the height of the aircraft compared to positioning the pistons vertically. The air cleaner 11 is positioned at the upper front of the airframe 5, and the radiator 12 is positioned at the upper rear. The top gear assembly 40 allows the arms to avoid interference with the air cleaner 11 and radiator 12 as positioned without increasing the height of the drive shaft 25. In a side view, it can be seen that the second arm 8 is positioned lower than the top of the air cleaner 11.

INDUSTRIAL APPLICABILITY

The present invention is suitable as a transmission system for unmanned aerial vehicles, allowing the propeller drive arms to avoid interference with the radiator or air cleaner without raising their position.

DESCRIPTION OF REFERENCE SIGNS

1. First propeller
2. Second propeller
3. Third propeller
4. Fourth propeller
5. Airframe
6. Propeller
6a. Blade
7. First arm
7a. Connection part
8. Second arm
8a. Connection part
9. Third arm
9a. Connection part
10. Fourth arm
10a. Connection part
11. Air cleaner
12. Radiator
13. Muffler
14. Crankshaft
15. Inline four-cylinder engine
16. First piston
17. Second piston
18. Third piston
19. Fourth piston
20. Drive gear
21. Driven gear
22. Centrifugal clutch
23. Clutch shaft
24. Bevel gear
25. Drive shaft
26. Base gear
27. Main gear
28. Left sub-gear
29. Left sub-drive shaft
30. Reverse gear
31. Right sub-gear
32. Right sub-drive shaft
33. First bevel gear
34. Second bevel gear
35. Third bevel gear
36. Fourth bevel gear
37. Follower gear
38. Foot
39. Cover
40. Top gear assembly
100. Transmission system
200. Unmanned aerial vehicle

The invention claimed is:

1. A transmission system for an unmanned aerial vehicle, the unmanned aerial vehicle including
   an airframe;
   four arms, namely a first arm, a second arm, a third arm, and a fourth arm arranged on the airframe in a clockwise direction;
   propellers provided on each end of the respective arms; and
   an inline four-cylinder engine that drives the propellers;
   the transmission system comprising:
   a drive gear mounted on a crankshaft of the inline four-cylinder engine;
   a driven gear mounted on a clutch shaft, meshing with the drive gear;
   a bevel gear mounted on the clutch shaft via a centrifugal clutch, driving a drive shaft perpendicular to the clutch shaft;
   a base gear mounted on the drive shaft and driven by the bevel gear;
   a top gear assembly comprising:
   a main gear mounted on the drive shaft;
   a left sub-gear meshing with the main gear;
   a reverse gear meshing with the main gear; and
   a right sub-gear meshing with the reverse gear;
   a first bevel gear and a second bevel gear, each meshing with the left sub-gear, the first bevel gear driving the first arm and the second bevel gear driving the second arm; and
   a third bevel gear and a fourth bevel gear, each meshing with the right sub-gear, the third bevel gear driving the third arm and the fourth bevel gear driving the fourth arm.

2. The transmission system for the unmanned aerial vehicle according to claim 1,
   wherein the inline four-cylinder engine is arranged with the crankshaft positioned laterally, oriented right and left relative to the airframe.

3. The transmission system for the unmanned aerial vehicle according to claim 1,
   wherein the inline four-cylinder engine is arranged with pistons positioned horizontally.

4. The transmission system for the unmanned aerial vehicle according to claim 1,
   wherein an air cleaner is positioned on an upper front portion of the airframe, and a radiator is positioned on an upper rear portion of the airframe.

* * * * *